US 6,568,750 B2

(12) United States Patent
Radmanic et al.

(10) Patent No.: US 6,568,750 B2
(45) Date of Patent: May 27, 2003

(54) MOTOR VEHICLE ROOF WITH AT LEAST ONE COVER WHICH CAN BE MOVED ABOVE THE FIXED MOTOR VEHICLE ROOF

(75) Inventors: Stjepan Radmanic, Mammendorf (DE); Erwin Kohout, Gräfelfing (DE)

(73) Assignee: Webasto Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 09/902,938

(22) Filed: Jul. 12, 2001

(65) Prior Publication Data

US 2002/0021031 A1 Feb. 21, 2002

(30) Foreign Application Priority Data

Jul. 12, 2000 (DE) .......................... 100 33 887

(51) Int. Cl.[7] .................................. B60J 7/047
(52) U.S. Cl. .................................. 296/216.03
(58) Field of Search ..................... 296/216.03

(56) References Cited

U.S. PATENT DOCUMENTS 5,275,461 A   1/1994   Cheron et al.
6,158,803 A   12/2000  Reihl et al.

FOREIGN PATENT DOCUMENTS

| DE | 42 38 945 C1 | 11/1993 |
| DE | 42 38 946 C1 | 11/1993 |
| DE | 197 13 348 C1 | 7/1998 |
| EP | 0 296 644 A2 | 12/1988 |
| JP | 61-160319 | 7/1986 |

*Primary Examiner*—Dennis H. Pedder
(74) *Attorney, Agent, or Firm*—Nixon Peabody LLP; David S. Safran (57) ABSTRACT

A motor vehicle roof with at least one cover (12) which can be moved above the fixed motor vehicle roof (13) and which can be raised at its rear edge (46), and with a control mechanism for the cover (12) which has a front lifting mechanism and a front displacement mechanism for the front edge (45) of the cover (12) and a rear lifting mechanism and a rear displacement mechanism for the rear edge (46) of the cover (12). The displacement mechanisms have control carriages (18, 19) which are connected to the cover (12) and which are movably guided and can be driven in lateral guide rails (17). The lifting mechanism for the front edge (45) of the cover (12) is integrated into the front control carriage (18) and the front and the rear control carriages (18 and 19) are securely connected on each side of the cover, spaced apart from one another, to a drive cable (21) so as to be driven by the drive cable.

4 Claims, 8 Drawing Sheets

MOTOR VEHICLE ROOF WITH AT LEAST ONE COVER WHICH CAN BE MOVED ABOVE THE FIXED MOTOR VEHICLE ROOF

BACKGROUND OF THE INVENTION

1. Field of the Invention

The invention relates to a motor vehicle roof with at least one cover which can be moved above the fixed motor vehicle roof and which can be raised at its rear edge, and with a control mechanism for the cover which has a front lifting mechanism and a front displacement mechanism for the front edge of the cover, and a rear lifting mechanism and a rear displacement mechanism for the rear edge of the cover, the displacement mechanisms comprising control carriages which are connected to the cover and which are movably guided and can be driven in lateral guide rails.

2. Description of Related Art

German Patent DE 42 38 945 C1 discloses a motor vehicle roof with at least one cover which can be raised for opening by means of a raising lever on its rear edge and then can be moved above the fixed motor vehicle roof. The displacement motion takes place by means of a first drive cable and the raising motion takes place by means of a second drive cable which can be moved in the opposite direction relative to it. A raising lever which controls the raising motion via the rear carriage is permanently engaged to one drive cable, while a carriage which is located near the front edge and which is responsible for the displacement motion of the cover is permanently engaged to the other drive cable which can be moved in the opposite direction thereto. By this permanent coupling, complete separation of the raising motion from the displacement motion is only conditionally possible and only a very short path of motion of the drive cable is available for the raising motion.

The defects of the above explained known motor vehicle roof are overcome by a motor vehicle roof of the initially mentioned type which is disclosed in German Patent DE 197 13 348 C1. In particular, this motor vehicle roof ensures a clearly defined position of the cover during the raising motion by locking the control carriage, which executes the displacement motion of the cover, to a roof-mounted guide rail via a locking block. Decoupling of the guide rail and simultaneous coupling to the control carriage define a specific start of the displacement motion, since the first drive cable, after traversing an idle path, with the completed raising motion, moves the locking block to its position locked with the guide rail into the coupling position of the drive cable with the control carriage.

German Patent DE 42 38 946 C1 discloses a motor vehicle with at least one cover which can be raised for opening by means of a raising lever on its rear edge, at least one guide element which is located on the cover engaging the roof-mounted guide. In this roof, the cover is raised by means of a raising mechanism, and in doing so, a guiding pin which is mounted on the cover is transferred to the railing-like roof guide which is located above the fixed roof. In this known roof, with the cover closed, the roof-mounted guide projects over the fixed roof skin so that, overall, a smooth surfaced appearance is not ensured. Furthermore, with the cover opened, the raising levers, which emerge forward from the cranks which are open in the direction of travel, remain upright; this, likewise, adversely affects the visual appearance of the motor vehicle roof. Furthermore, there is the danger that the raising lever is changed by shaking motions in its raised position such that, when the cover is closed, the cover which moves forward, with the cover crank open forward, can miss the corresponding pin on the raising lever under certain circumstances.

These defects are overcome by the construction of the motor vehicle roof of the initially mentioned type which is known from German Patent DE 197 13 347 C1 and its corresponding U.S. Pat. No. 6,158,803, and in which the guide element is formed by a support lever which is independent of the raising lever and which is coupled at one end in the rear area of the cover and its other end is supported with at least one sliding element in the roof-mounted guide which is located underneath the fixed motor vehicle roof.

The motor vehicle roofs known from the aforementioned U.S. Pat. No. 6,158,803 and German Patent DE 197 13 348 C1, however, have the defect that the displacement motion takes place in a relatively complex manner by means of a first drive cable, while a second drive cable is necessary for the raising motion. Moreover, the parts which effect the displacement motion and the raising motion must be coupled via additional locking blocks to the respective drive cable or to the roof-mounted guide rail.

SUMMARY OF THE INVENTION

A primary object of the present invention is to devise a motor vehicle roof of the initially mentioned type which has an adjustment and lifting mechanism which is simplified with respect to function and structure.

This object is achieved in a generic motor vehicle roof by the lifting mechanism for the front edge of the cover being integrated into the front control carriage and by the fact that the front and the rear control carriages are securely connected, on each side of the cover spaced apart from one another, to a drive cable and can be driven by it.

Because, in accordance with the invention, the lifting mechanism for the front edge of the cover is completely integrated into the front control carriage and the front and rear control carriages are driven on each side of the cover by a single drive cable to which they are securely attached, spaced apart from one another, a single drive cable per cover side is enough to execute the raising motion and the displacement motion of the cover.

The raising and displacement mechanism in accordance with the invention represents a simple, durable cover mechanism which works reliably, which can be built with a relatively small number of parts, and which is thus economical.

Feasibly, in the motor vehicle roof, there can be cover-mounted sliding elements or sliding pins on either side of the front edge of the cover for guiding the front edge of the cover when the cover is displaced in the roof-mounted guide paths of the guide rails, and there can be guide paths which descend forward for guiding the front edge of the cover in its raising and lowering motion, then the guide paths being formed in cranks which are securely connected to the guide rails, and the top ends of the guide paths running into the forward ends of the lengthwise guide paths of the guide rails.

According to one advantageous embodiment, it is provided that the front lifting mechanism has a sliding element such as, for example, a journal which is guided in the guide path of a lifting crank which is located on the front control carriage, the guide path running in the opposite direction relative to the roof-mounted guide path of the crank and rising in the direction toward the front edge of the cover.

In a development of the invention with support levers which are guided by cranks and which are coupled to the cover on either side of the rear edge of the cover, it is advantageously provided that a raising lever is pivotally coupled to the rear control carriage and is raised by a roof-mounted lifting crank in backward motion of the rear control carriage for lifting the rear cover edge and thereupon is dynamically disengaged from the cover and in doing so transfers the support of the rear edge of the cover to the support lever. Preferably in this version it is provided that the support lever is coupled by one end to the cover, by means of a guiding pin which can be for example also a pivotally supported sliding block, is guided permanently in the guiding member path of the guide rail and on the other end has another support pin which can also be formed as a slip-on sliding block. The guiding member path can be formed in a second, external guide rail which is located offset to the outside by the first inner guide rail.

In the following the invention is detail with reference to the accompanying drawings which show a preferred embodiment of the invention.

DETAILED DESCRIPTION OF THE INVENTION

A motor vehicle roof 10 (see FIG. 1) comprises a wind deflector louver 11 which is pivotally located above the windshield 44, a movable cover 12 which is located behind the wind deflector louver 11, and a fixed roof pane 13 which adjoins the rear of the closed cover 12. At each lateral side of the roof, the wind deflector louver 11, the cover 12 and the roof pane 13 are each bordered by a side member 14.

Figure 1:
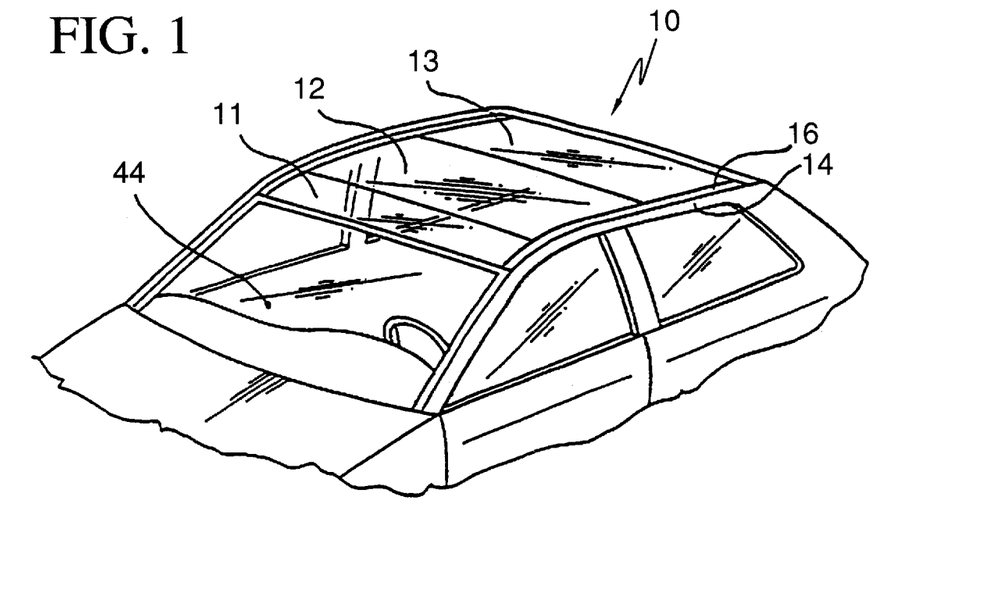
FIG. 1 is a schematic perspective view of a motor vehicle roof with the cover closed.
Figure 2:
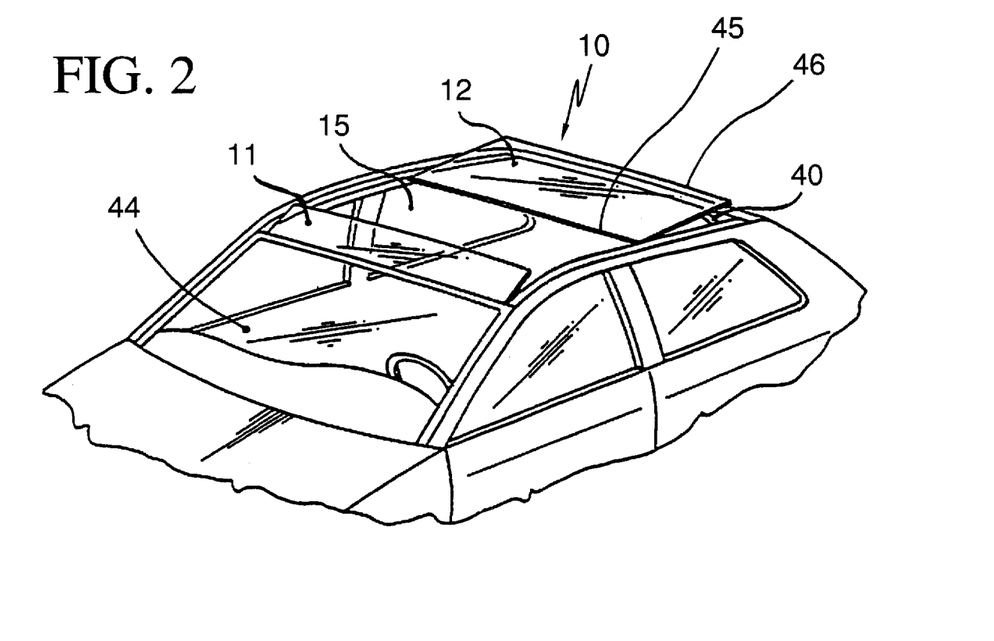
FIG. 2 is a view corresponding to that of FIG. 1, but with the cover completely opened.
Figure 3:
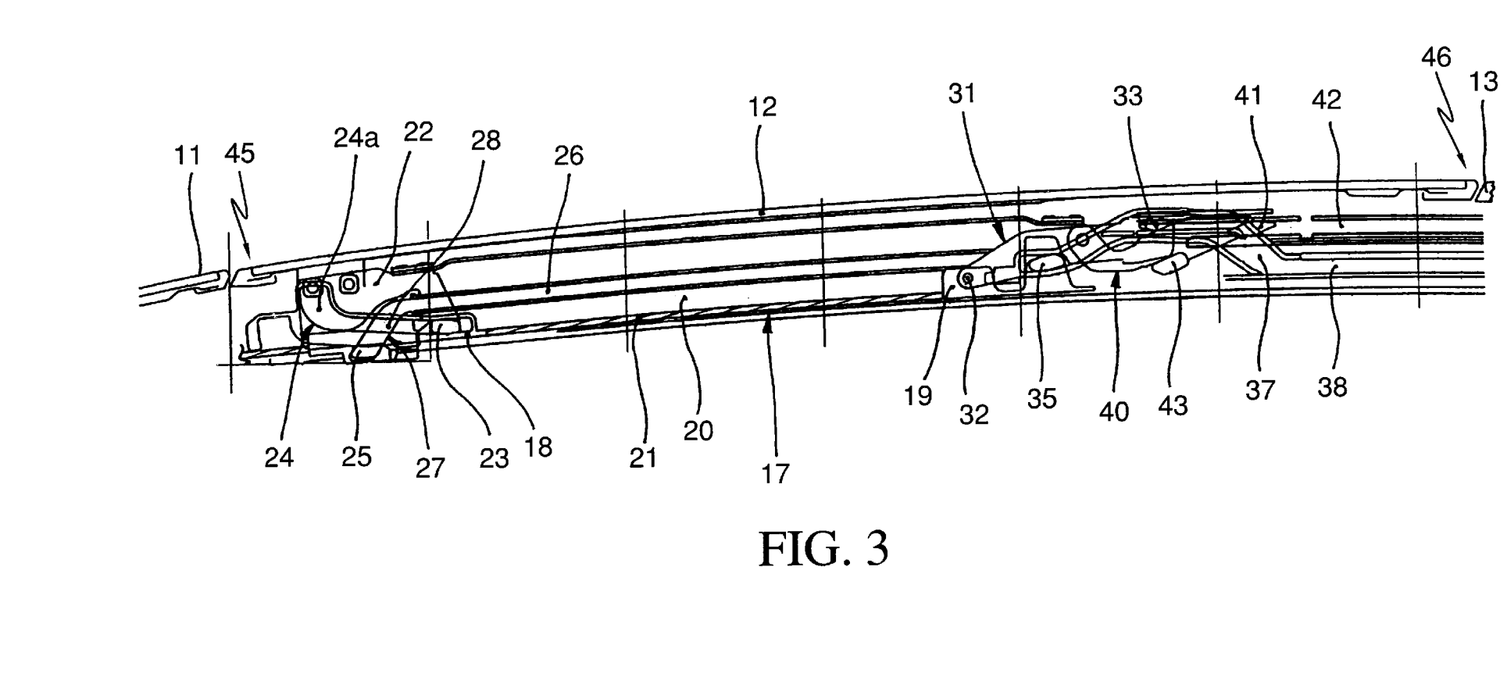
FIG. 3 is a lengthwise section through one side edge of the motor vehicle roof in the area of the raising mechanism with the cover closed.

In the closed state shown in FIG. 1, the motor vehicle roof 10 has a completely smooth appearance. Although the cover 12 can be pushed to the rear above the fixed motor vehicle roof 10 to expose the roof opening 15 (see FIG. 2), no guides located above the fixed motor vehicle roof 10 are necessary at all for this purpose. In the raised state, moved to the rear, the cover 12 is supported rather by means of support levers 40 which are coupled laterally in the area of the rear edge 46 of the cover, which can be moved in guides located underneath the level of the fixed roof skin and which, as they emerge upward, partially displace a flexible sealing element 16 which is located between the side members 14 and the components 11, 12, and 13.

The mechanism which is necessary for raising and displacing the cover 12 is built identically on the left and right side of the cover 12 so that only the mechanism of one side is described and explained below using FIGS. 3 to 9.

The raising and displacement mechanism for the cover 12 comprises a guide rail 17 which is formed as a profile part with guide paths which run in the lengthwise direction. In the lower guide path 20, the front control carriage 18 and the rear control carriage 19 are guided to move lengthwise. The two control carriages 18, 19 are securely joined to the drive cable 21 at a mutual distance. Moreover, the control carriages 18, 19 are connected to the front edge 45 and the rear edge 46 of the cover 12, respectively, especially via a guide track or support lever for raising and carrying the front edge 45 and the rear edge 46 of the cover 12 in its displacement between its closed and open positions, as is explained in further detail below, first of all, for the front edge 45 of the cover and then for the rear edge 46 of the cover.

Figure 4:
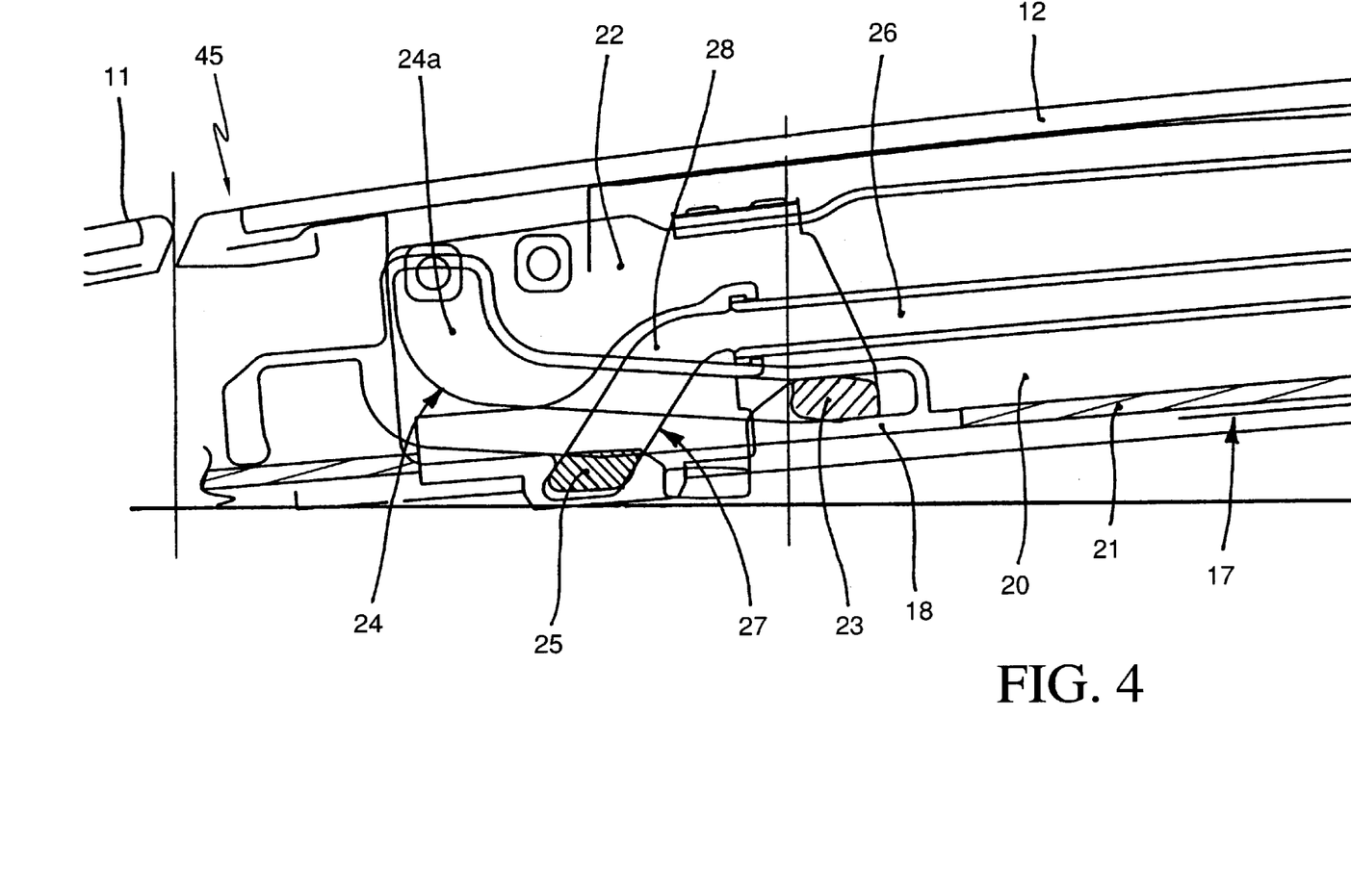
FIG. 4 is an enlarged representation of the front raising mechanism in FIG. 3.
Figure 7:
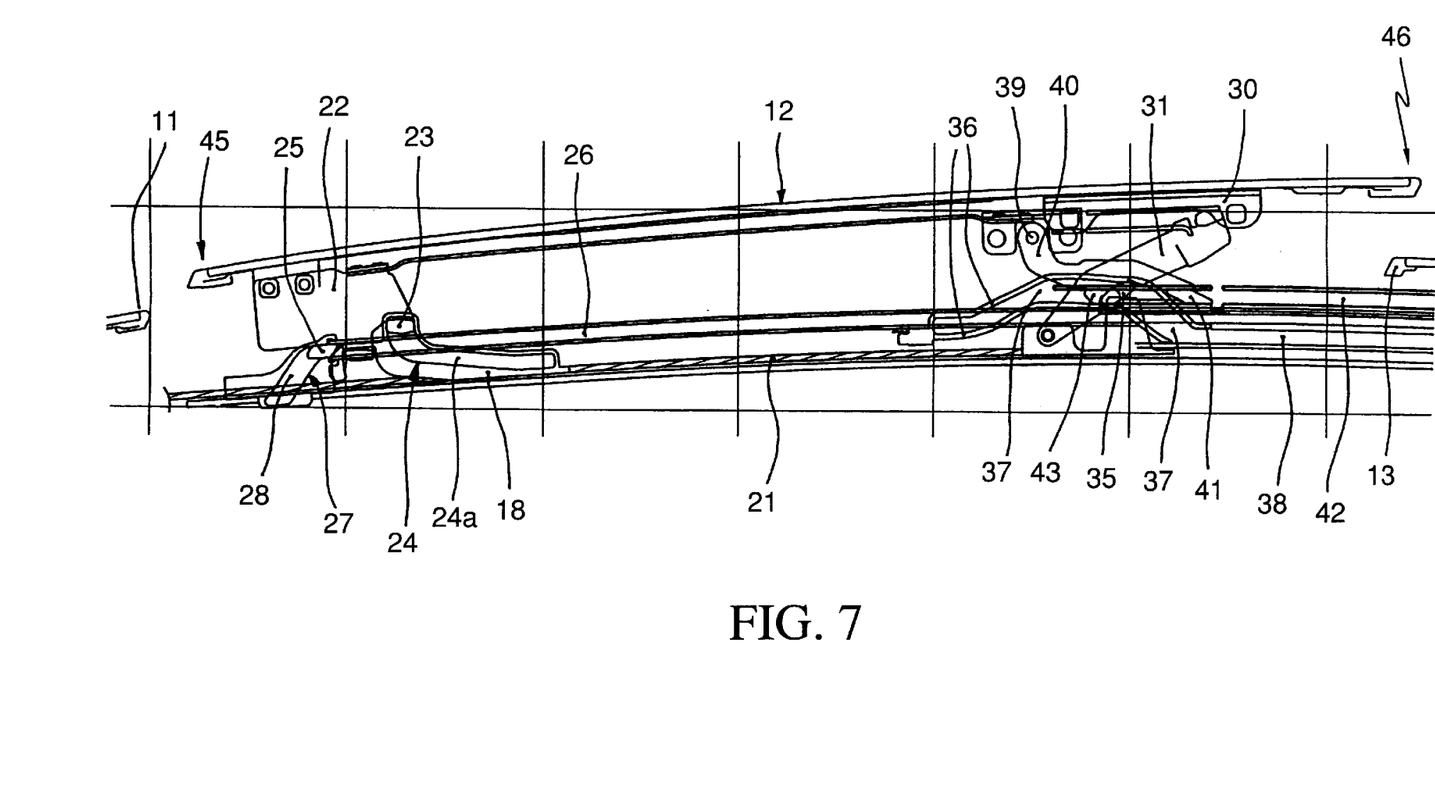
FIG. 7 is an enlarged representation of the area of the raising mechanism in FIG. 3, with the cover at the end of the transition motion.
Figure 8:
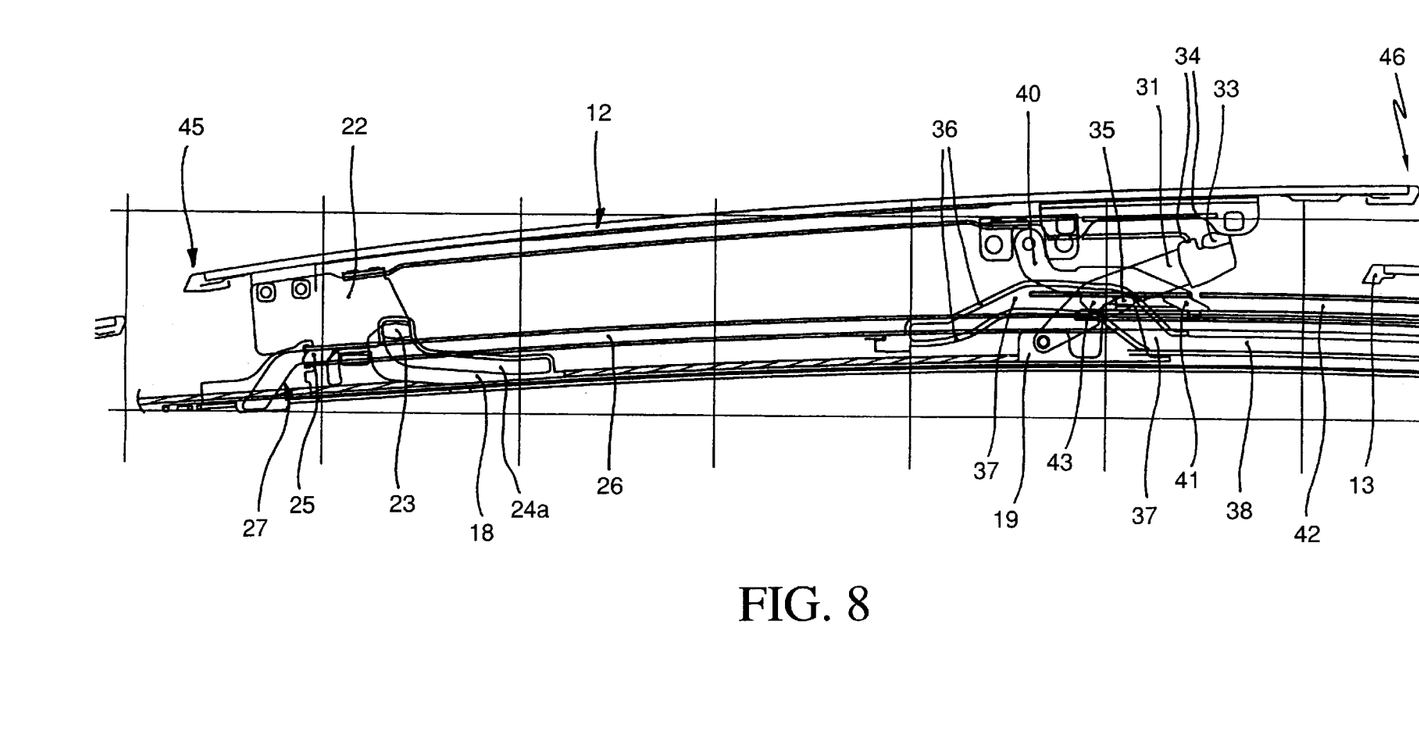
FIG. 8 is an enlarged representation of the area of the raising mechanism in FIG. 3, with the cover in an intermediate position.

On the bottom of the cover 12, in the area of its front edge 45, there is a lateral vertical cover carrier 22. A laterally projecting journal 23 of the cover 12 is connected to the rear edge of the cover carrier 22 at a distance from the front edge 45. The journal 23 fits into the guide path 24a of a lifting guide 24 which is securely attached to the front control carriage 18, being formed integrally with it. The guide path 24a of the lifting guide 24 runs ascending from its back end to its front end in the area of the front edge 45 of the cover 12. In particular, the guide path 24a is formed in a roughly L-shape with a front short bent leg section and a rear long bent leg section. The journal 23 is located with the cover 12 closed in the area of the back end of the guide path 24a (FIGS. 3 & 4), and with the cover 12 raised and forward, as well as during the displacement of the cover 12 on the front elevated end of the guide path 24a (see, for example, FIG. 7). The journal 23 moves in the guide path 24a as a result of the lengthwise displacement of the control carriage 18 which is caused by the drive cable 21, the journal 23 moving out of its lower position shown in FIG. 1 with the cover 12 closed by displacement rearward of the front control carriage 18 into its top position in which the front edge 45 of the cover 12 is raised (see, FIG. 7). As can be seen in FIGS. 4 & 7, the journal 23 has a generally rectangular cross section with two pairs of opposed surfaces, one pair being longer than the other. As can be seen in FIG. 4, during movement of the journal through the rear long bent leg section of the guide path 24a, the longer pair of opposed surfaces engage the guide surfaces of the guide path 24a. On the other hand, as shown in FIGS. 7 & 8, the shorter opposed pair of surfaces of the journal 23 engage the guide surfaces of the front short bent leg section of the guide path 24a.

Laterally, the sliding pin 25 projects from the cover carrier 22 and is likewise attached to the lower edge of the cover carrier 22. In the embodiment shown, pin 25 is located is in front of the journal 23 in the lengthwise direction of the motor vehicle. Furthermore, the guide rail 17 comprises a guide path 26 for the sliding pin 25 which runs 7 parallel to the carriage guide path 20 in the lengthwise direction of the guide rail 17. A guide 27 for guiding the front edge 45 of the cover in its raising and lowering motion adjoins the front end of the sliding pin guide path 26. This guide 27 is securely joined to the guide rail 17 or the motor vehicle roof 10, and has a guide path 28 which adjoins the front end of the sliding pin guide path 26 of the guide rail 17 and runs downward toward the front. With the cover 12 closed, the sliding pin 25 (see, FIG. 3) is located on the bottom end of the guide path 28. The sliding pin 25 is guided largely without play in the lengthwise direction (x-direction) of the motor vehicle, and thus, determines the exact position of the front edge 45 of the cover 12 when it is in the closed position. As is apparent from FIGS. 4, 7 & 8, the sliding pin 25 has the shape of a parallelogram in cross section with two pairs of opposed surfaces, one pair being longer than the other. As can be seen in FIG. 4, during movement of the sliding pin 25 through the guide path 28, the inclined pair of opposed surfaces engage the guide surfaces of the guide path 28 of the guide 27. On the other hand, as shown in FIGS. 7 & 8, the horizontal pair of surfaces of the sliding pin 25 engage the guide surfaces of the guide path 26 of the guide rail 17.

The exact position of the front edge 45 of the cover in the vertical direction (z-direction) is determined by the journal 23 which is held in the rear section of the guide path 24a essentially without play in the vertical direction. When the front edge 45 of the cover is raised by means of the lifting guide 24 and the journal 23, by moving the front control carriage 18 to the rear, at the same time, the sliding pin 25 moves along the guide path 28, which rises to the rear, and ultimately enters the front end of the sliding pin guide path 26 of the guide rail 17 (see, FIG. 5). At this point, the cover 12 has assumed a position in the area of its front edge 45 from which it can be moved to the rear.

The lifting and displacement mechanism in the area of the rear edge 46 of the cover 12 is explained below using the lengthwise displacement of the rear guide carriage 19 via the drive cable 21.

Figure 5:
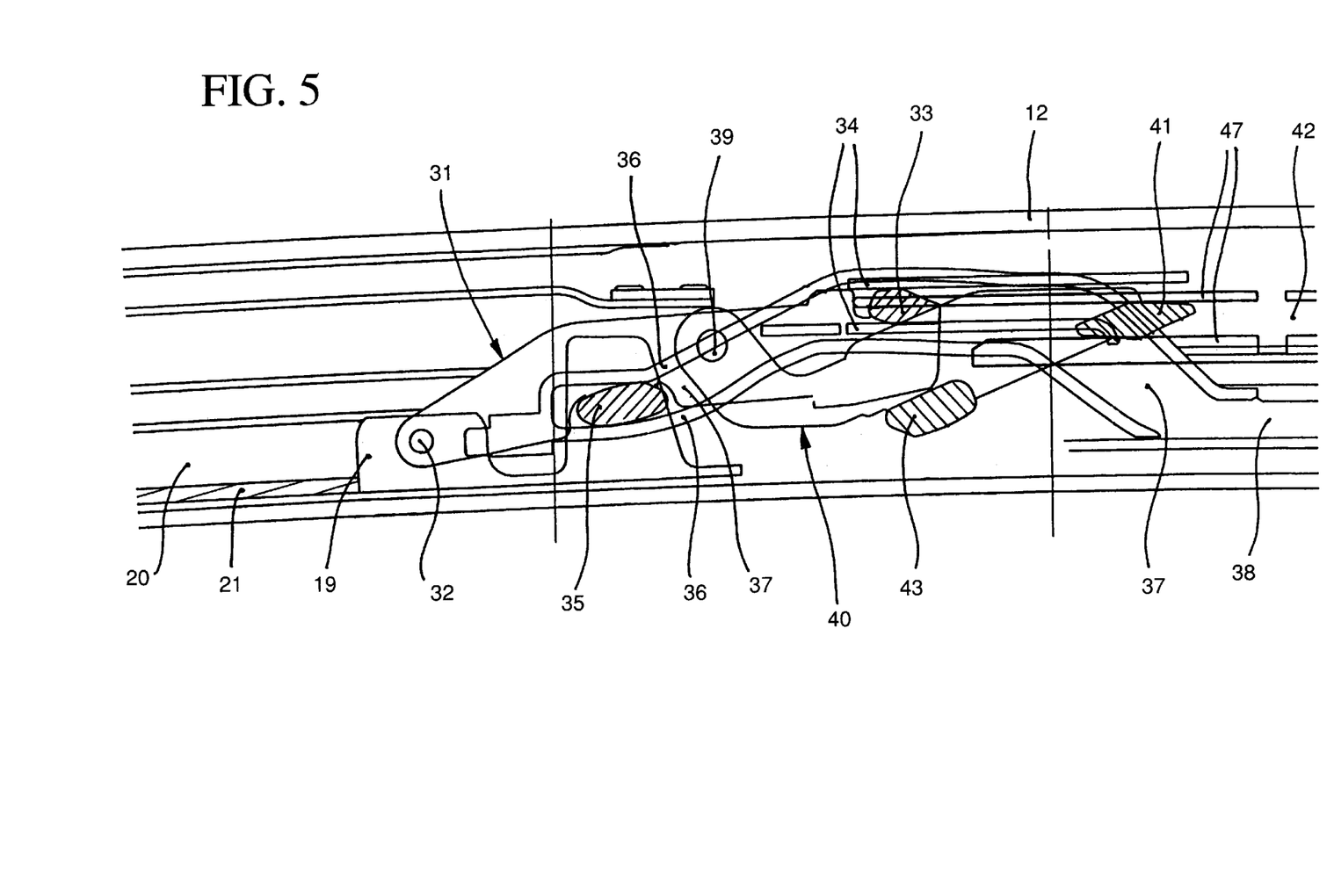
FIG. 5 is an enlarged representation of the rear raising mechanism in FIG. 3.
Figure 6:
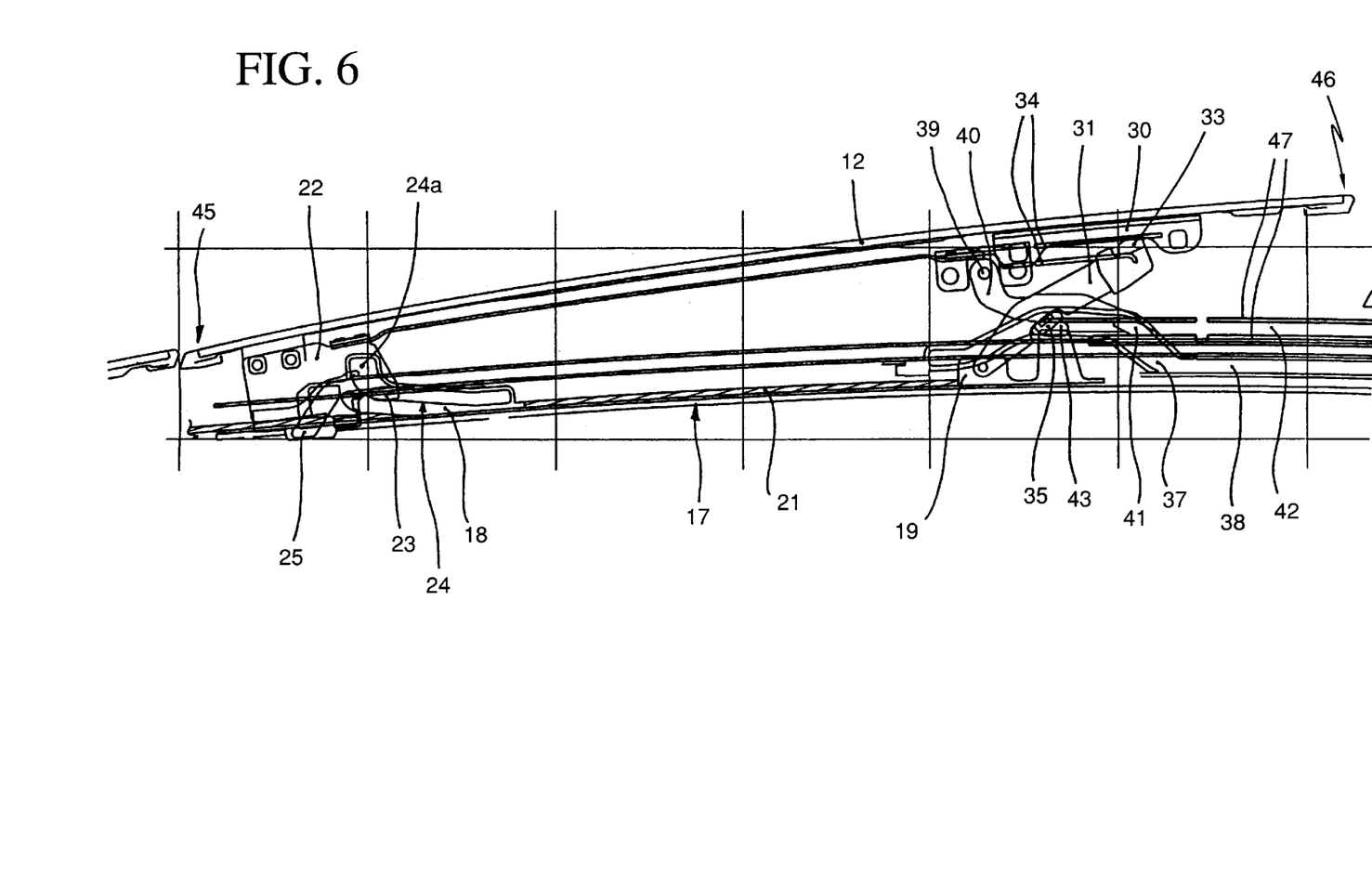
FIG. 6 is an enlarged representation of the area of the raising mechanism in FIG. 3, with the cover raised.

The cover 12 in the area of its rear edge 46 has a cover carrier 30 which extends downward (see, FIG. 6). To lift the back edge 46 of the cover 12, a raising lever 31 is used which, on its front end, is coupled by a bearing pin 32 to be able to pivot relative to the rear control carriage 19, and which has a laterally projecting raising member 33 on its back end. The raising pin 33, with the cover closed (FIG. 3), fits as far as the raised cover position or transfer position (FIG. 5) into a raising guide 34 on the cover carrier 30 which is open to the rear (see, for example, FIG. 5). Between the bearing pin 32 and the raising pin 33, a lifting pin 35 projects laterally from the raising lever 31 and is guided by sliding in a lifting guide 36 which is mounted on the guide rail. The guide path 37 of the lifting guide 36 runs from front to back, first ascending, thereafter essentially parallel to the lengthwise direction of the guide rail 17, and then descending and ending in the guide path 38 of the guide rail 17, which can coincide with the carriage guide path 20.

A bearing pin 39 couples the support lever 40 for the rear edge 46 of the cover to the cover carrier 30. On the end of the support lever 40, opposite the bearing pin 39, a guiding member 41 projects laterally from lever 40 and is guided in all positions of the rear edge 46 of the cover 12 in the guiding member path 42 of a guide rail 47 which is external relative to the initially mentioned inner guide rail 17. The guiding member path 42 runs in the lengthwise direction of the guide rail 47. Instead of the inner guide rail 17 and the outer guide rail 47, there can also be only one guide rail which contains the indicated guide paths.

Roughly in the center between the bearing pin 39 and the guiding member 41, a support member 43 projects laterally from the support lever 40, and only after completely raising the rear edge 46 of the cover 12, enters the guiding member path 42, and as the cover 12 continues to move, slides to the rear in this guiding member path 42 in order to support the cover 12 which has been pivoted upward to the rear jointly with the guiding member 41 which is guided in the guiding member path 42 instead of the raising lever 31.

Figure 9:
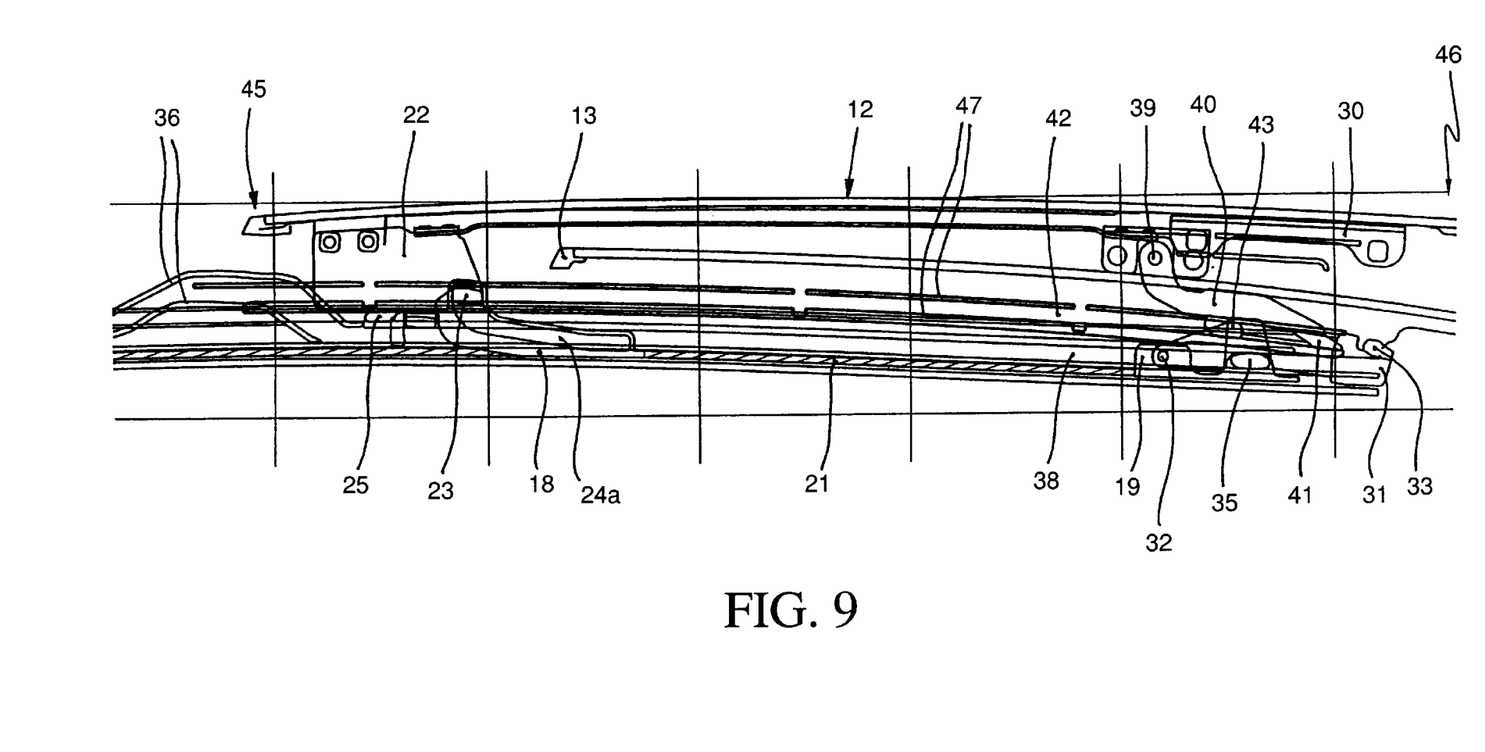
FIG. 9 is an enlarged representation of the area of the raising mechanism in FIG. 3, with the cover opened.

Using FIGS. 5 & 9, the raising of the rear edge 46 of the cover 12 into the cover open position as shown in FIG. 7 is explained below.

When the rear control carriage 19 is moved to the rear proceeding from the cover closed position (see FIG. 5) by means of the drive cable 21, the lifting pin 35 of the raising lever 31 first moves upward in the front ascending section of the guide path 37 of the lifting crank 36 (FIG. 6) so that the raising lever 31 which has been pivoted upward, by means of the raising member 33 which is guided in the raising guide 34, raises the rear edge 46 of the cover 12 over the fixed roof. In the position shown in FIG. 6, the support member 43, which so far has not been drawn in, enters the guiding member path 42 and now slides, as the rear control carriage 19 continues to move backwards, jointly with the guiding member 41 which slides in front of it along the guiding member path 42 with the support of the cover 12 at a stipulated raising angle to the rear. When the rear control carriage 19 is moved from the position shown in FIGS. 3 & 5 into the position shown in FIG. 6 in which the rear edge 46 of the cover 12 is raised, the raising member 33 moves from the front end of raising guide 34 to its back open end, from which the raising member 33 emerges as the rear control carriage 19 continues to move backward (see FIG. 7 which shows the transfer position). During the transition from the position shown in FIG. 6 to the position shown in FIG. 7, the lifting pin 35 moves along the horizontal part of the guide path 37 of the lifting guide 36, and thereupon, travels into the descending part of the guide path 37 so that the raising lever 31 is pivoted down again roughly into the horizontal position.

As the rear control carriage 19 continues to move to the rear, the lifting pin 35 enters the guide path 38 which guides the raising lever 31 during further backward motion of the control carriage 19 into its lowered horizontal position, in which it is inoperative. The raised position of the rear edge 46 of the cover 12 is maintained exclusively by the support lever 40, the two pins 41 and 43 of which are guided in the guiding member path 42.

The closing motion of the cover 12 takes place with common, coupled forward running of the two guide carriages 18 and 19 with the reverse sequence of the pivoting motions of the rear edge 46 and the front edge 45 of the cover 12.

While a single embodiment in accordance with the present invention has been shown and described, it is understood that the invention is not limited thereto. This embodiment may be changed, modified and further applied by those skilled in the art.

Therefore, this invention is not limited to the details shown and described previously but also includes all such changes and modifications which are encompassed by the appended claims.

What is claimed is:

1. Motor vehicle roof comprising:
   at least one cover which is movable above a fixed motor vehicle roof and which is liftable at a rear edge thereof, and
   a control mechanism for the at least one cover which has a front lifting mechanism and a front displacement mechanism for a front edge of the at least on cover, and a rear lifting mechanism and a rear displacement mechanism for a rear edge of the at least one cover, the front and rear displacement mechanisms comprising front and rear control carriages, respectively, which are connected to the at least one cover and which are movably guided and driven in lateral guide rails,
   wherein the lifting mechanism for the front edge of the cover is integrated into the front control carriage, and wherein the front and the rear control carriages are securely connected to a drive cable at locations that are spaced apart from one another on each side of the cover;

further comprising cover-mounted sliding members on each side of the front edge of the cover for guiding the front edge of the cover when the cover is displaced in a respective roof-mounted longitudinal guide path of each of the guide rails; wherein raising and lowering guide paths are formed in guides which are securely connected to each of the guide rails and which descend in a forward direction for guiding the front edge of the cover during raising and lowering thereof wherein top ends of the raising and lowering guide paths of the guides which are connected to the guide rails open into forward ends of roof-mounted longitudinal guide paths of the guide rails; wherein cover-mounted sliding members have first and second pairs of opposed surfaces, the first pair of opposed surfaces engaging guide surfaces of the respective longitudinal guide path and the second pair of opposed surfaces engaging guide surfaces of the raising and lowering guide paths.

2. Motor vehicle roof as claimed in claim 1, wherein the front lifting mechanism has a journal which is guided in a lifting guide path of a lifting guide which is located on the front control carriage, the lifting guide path of each lifting guide running in an opposite direction relative to the raising and lowering guide path of the respective guide and rising in a direction toward the front edge of the cover; wherein said journal has first and second pairs of opposed surfaces, the first pair of opposed surfaces engaging guide surfaces of a translatory portion of the respective lifting guide path and the second pair of opposed surfaces of the journal engaging guide surfaces of a lifting portion of the respective raising guide path.

3. Motor vehicle roof as claimed in claim 1, further comprising support levers which are coupled to the cover on each side of the rear edge, wherein a raising lever is pivotally coupled to each rear control carriage and is liftable by a roof-mounted lifting guide in backward motion of the rear control carriage for lifting the rear cover edge and is dynamically disengagable from the cover after lifting thereof so as to transfer supporting of the rear edge of the cover from each raising lever to a respective one of the support levers.

4. Motor vehicle roof as claimed in claim 3, wherein each support lever is coupled at one end to the cover, and is coupled at an opposite end to a guiding member which is guided permanently in a guiding member path of the guide rail, and wherein a second support member is provided between the ends of the support lever, said second support member being adapted to enter the guiding member path when the support lever is placed upright.

* * * * *